O. M. SNYDER.
CAR FENDER.
APPLICATION FILED MAR. 16, 1910.
969,667.
Patented Sept. 6, 1910.
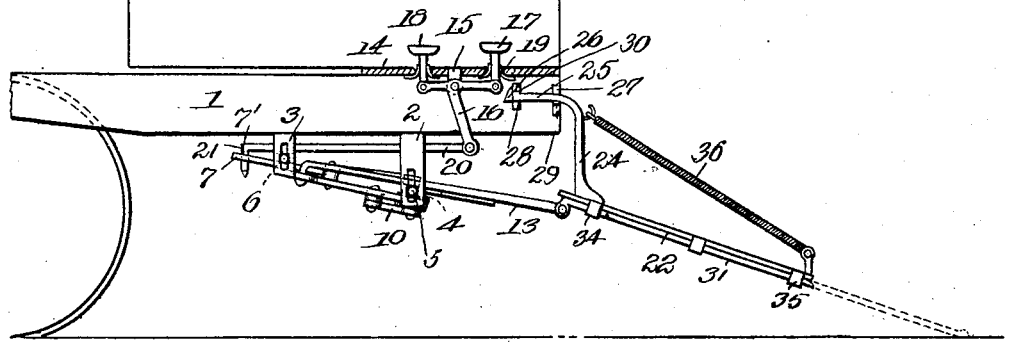
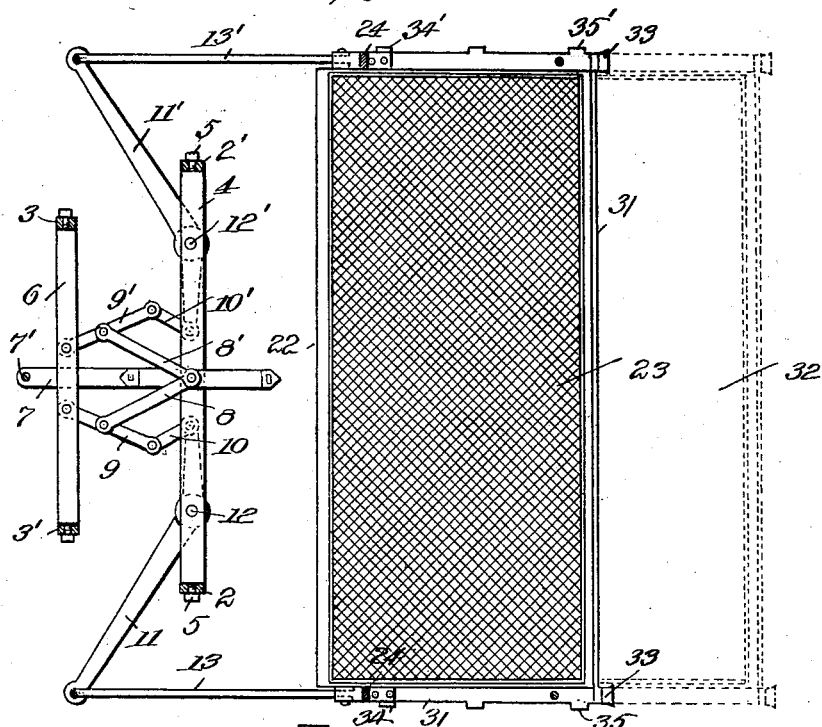
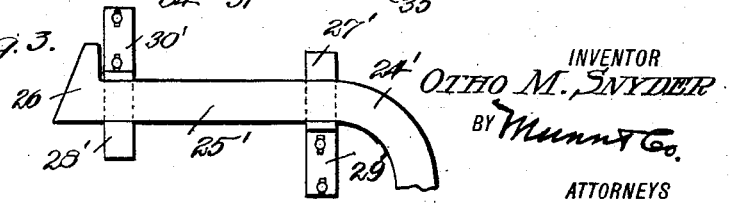
WITNESSES:
F. C. Barry
L. A. Stanley
INVENTOR
OTHO M. SNYDER
BY Munn & Co.
ATTORNEYS

UNITED STATES PATENT OFFICE.

OTHO M. SNYDER, OF HAGERSTOWN, MARYLAND.

CAR-FENDER.

969,667.  Specification of Letters Patent.  Patented Sept. 6, 1910.

Application filed March 16, 1910. Serial No. 549,612.

*To all whom it may concern:*

Be it known that I, OTHO M. SNYDER, a citizen of the United States, and a resident of Hagerstown, in the county of Washington and State of Maryland, have made certain new and useful Improvements in Car-Fenders, of which the following is a specification.

My invention relates to car fenders and it consists in the combinations, constructions and arrangements herein described and claimed.

An object of my invention is to provide a car fender having an extension arranged to be projected forwardly by the driver or motorman of the car, so as to receive the body of the person who is in danger.

A further object of my invention is to provide a sliding extension which can be projected forwardly in the manner described above, by a system of levers, which operate so that the force is applied at the opposite sides of the movable member with the same intensity, thereby eliminating the danger of the sliding member becoming jammed in its guides, as would occur if the force were applied only at the center.

A further object of my invention is to provide a fender which may be readily attached or detached from a car, but which will be held securely in position when in use.

Other objects and advantages will appear in the following specification and the novel features of the device will be particularly pointed out in the appended claims.

My invention is illustrated in the accompanying drawings forming part of this application in which similar reference characters indicate like parts in the several views, in which—

Figure 1 is a side view of the device showing its attachment to a car. Fig. 2 is a plan view of the fender and of a portion of the operating mechanism, and Fig. 3 is a detail view showing the attaching means.

In carrying out my invention I secure to the brace beams or bottom 1 of the car frame the slotted forward brackets 2 and 2′ and the slotted rear brackets 3 and 3′. Between the brackets 2 and 2′ is adjustably secured a cross member 4 by means of bolts 5, or other suitable connections. A parallel cross member 6 is similarly secured between the brackets 3 and 3′.

Centrally disposed of the cross pieces 4 and 6 is a movable bar 7 provided at its rear end with an opening 7′. To this bar are pivotally connected the links 8 and 8′ which have pivotal connections with the links 9 and 9′ pivoted upon the upper side of the cross piece 6. The opposite ends of the links 9 and 9′ are pivotally connected to the links 10 and 10′ which in turn have pivotal connections with the bell-crank levers 11 and 11′ respectively which are pivoted to the under side of the cross member 4 at 12 and 12′ respectively. The outer ends of the bell-cranks 11 and 11′ are pivotally connected with the rods 13 and 13′.

Referring now to Fig. 1, it will be seen that the car is provided on its bottom 14 with the bracket 15 to which is pivotally connected a T-shaped lever 16. One end of this lever is pivotally connected with a push-rod 17, while the other is similarly connected to a push-rod 18. These push-rods extend through the bottom of the car and are normally pressed upon by means of springs 19, so as to hold them by frictional engagement in any position in which the pin is moved. The lower end of the T-shaped lever 16 is pivotally connected to a rod 20, having a hooked end 21, arranged to enter the opening 7′ of the bar 7.

The fender proper consists of a main frame 22, having a netting 23. The frame and netting constitute the stationary portion of the fender. This is detachably secured to the car body by means of the rods 24. The means by which this is done is as follows: Referring now to Fig. 1, it will be seen that the rod 24 is secured at its lower end to the frame 22 and has a bent portion 25 provided with a hook 26. The arm 25 is adapted to pass between the opposed brackets 27 and 27′ secured to the front end of the car and between the opposed brackets 28 and 28′ secured in the rear of the first mentioned brackets. The brackets 27 and 27′ are provided with adjustable bearing plates 29 and 29′ on their lower ends while the brackets 28 and 28′ are provided with bearing plates 30 and 30′ on their upper ends. Disposed normally underneath the stationary part of the fender 23 is a slidable extension comprising a frame 31, having a netting 32 similar to that shown at 23. The forward ends of the frame are provided with shoes 33 which are designed to come in contact with the rail if desired. The frame 31 is slidably supported in brackets 34 and 34′ and 35 and 35' depending from the under side of the stationary frame 32. The rear ends of the side portions of the frame 31 are pivotally connected to the rods 13 and 13'.

From the foregoing description of the various parts of the device the operation thereof may be readily understood.

The fender is attached to the car by inserting the arms 25 and 25' above the bearing plates 29 and 29' of the brackets 27 and 27' respectively and then hooking the hooks 26 and 26' behind the bearing plates 30 and 30' of the brackets 28 and 28' respectively. This permits the fender to hang upon the brackets in the manner shown in the figure. The fender cannot come forward because of the hook 26 and its rearward movement is limited by the rods 24 and 24'. The bearing plates 29 and 30, and 29' and 30' are adjustable so as to incline the fender more or less as is desired. In attaching the fender the rod 20 is inserted in the opening 7' of the rod 7.

With the apparatus set up as described, when the motorman sees an object or person who is liable to be run over by the car, he presses downwardly on the foot-rod 17 thereby causing the lever 16 to move rearwardly and causing a rearward movement of the rod 20 and the sliding rod 7. Owing to the toggle joint arrangement the arms of the bell-crank levers 11 and 11' will be swung forwardly, in the manner indicated in dotted lines in Fig. 2. This will project the slidable extension downwardly in the manner shown in dotted lines in Fig. 1, thereby preventing the body from passing underneath the stationary fender part. The body is projected backwardly upon the screen 23 and is prevented from falling off the sides by means of a spring, such as that shown at 36 which is attached at each side of the fender.

The springs 19 hold the fender in its extended position by frictional contact with the foot-rod as before explained. Now when it is desired to return the fender to its normal position the push-rod 18 is manipulated thereby reversing the motion of the lever arrangement and throwing the device into its normal position.

With the arrangement just described the extension can be quickly projected forward and instantly withdrawn. The fender can be detached or attached quickly to a car. The apparatus is simple and effective. The novel form of lever motion applies the projecting force at each side of the fender with absolutely the same intensity, the corresponding levers such as 8, 9, 10, 11 and 8', 9', 10' and 11' being, of course, of the same size. This obviates all danger of the extension becoming caught in the guides, owing to an unequal or pivotal movement as where the force is applied only at the center of the fender. The working of the device is therefore insured and the danger from the apparatus failing to work is reduced to a minimum.

I claim:

1. The combination with a vehicle provided with a foot-rod, of a fender comprising a stationary member, and a movable member carried by said stationary member and adapted to form an extension thereof, a foot-rod disposed in the vehicle floor, a pair of bell-crank levers, pivotal connections between the ends of said bell-crank levers and said movable member, and lever connections between said foot-rod and said bell-crank levers.

2. The combination with a vehicle provided with a foot-rod, of a fender comprising a stationary member and a movable member carried by said stationary member and adapted to form an extension thereof, a foot-rod disposed in the vehicle floor, a pair of bell-crank levers pivotally secured to the bottom of the vehicle, a slidable rod disposed between said bell-crank levers, link connections between each of said bell-crank levers and said slidable rod and means actuated by said foot-rod for moving said slidable rod.

OTHO M. SNYDER.

Witnesses:
  JOHN D. MAIN,
  D. ELMER WOLF.